(12) United States Patent
Latzina

(10) Patent No.: US 9,449,062 B2
(45) Date of Patent: Sep. 20, 2016

(54) DATA EXPLORATION COMBINING VISUAL INSPECTION AND ANALYTIC SEARCH

(71) Applicant: SAP AG, Walldorf (DE)

(72) Inventor: Markus Latzina, Wiesenbach (DE)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 13/630,053

(22) Filed: Sep. 28, 2012

(65) Prior Publication Data

US 2014/0096056 A1    Apr. 3, 2014

(51) Int. Cl.
*G06F 3/048* (2013.01)
*G06F 17/30* (2006.01)

(52) U.S. Cl.
CPC .............. *G06F 17/30572* (2013.01)

(58) Field of Classification Search
CPC ................ G06F 3/048; G06F 17/30554
USPC .................................. 715/771, 772
See application file for complete search history.

(56) References Cited

U.S. PATENT DOCUMENTS

| 5,911,138 | A | * | 6/1999 | Li et al. | |
| 5,917,499 | A | * | 6/1999 | Jancke et al. | 345/440 |
| 6,014,661 | A | * | 1/2000 | Ahlberg et al. | |
| 6,192,266 | B1 | * | 2/2001 | Dupree | A61B 5/0422 600/427 |
| 7,528,981 | B2 | * | 5/2009 | Johnson | G06F 11/0733 358/1.15 |
| 7,756,810 | B2 | * | 7/2010 | Nelken | G06F 17/30286 706/60 |
| 7,853,552 | B2 | * | 12/2010 | Beringer et al. | |
| 2002/0158918 | A1 | * | 10/2002 | Feibush et al. | 345/853 |
| 2008/0195930 | A1 | * | 8/2008 | Tolle | 715/227 |
| 2010/0100562 | A1 | * | 4/2010 | Millsap | 707/770 |
| 2012/0035986 | A1 | * | 2/2012 | Jimenez | 705/7.42 |
| 2012/0102432 | A1 | * | 4/2012 | Breedvelt-Schouten | G06F 17/30398 715/823 |
| 2013/0227429 | A1 | * | 8/2013 | Sivadas | 715/751 |

OTHER PUBLICATIONS

Master Visually Excel 2010, Elaine Marmel, p. 368, 2010.*
"Support", available at http://support.microsoft.com/en-us/kb/213750, Sep. 2011.*
Matplotlib for Python Developers, Sandro Tosi, Nov. 9, 2009, p. 61 (hereinafter Tosi).*

* cited by examiner

*Primary Examiner* — Matthew Ell
(74) *Attorney, Agent, or Firm* — Brake Hughes Bellermann LLP

(57) ABSTRACT

A computer device displays a graph of a data set. The computer device includes a hybrid data analysis and visualization tool to query implicit properties of data items in the data set that are not evident upon visual inspection of the graph of the data set itself. The hybrid data analysis and visualization tool combines the graph of the data set with analog representations of data query results for visual data exploration.

18 Claims, 9 Drawing Sheets

100

DATA EXPLORATION COMBINING VISUAL INSPECTION AND ANALYTIC SEARCH

BACKGROUND

A plot is a graphical technique for representing a data set, usually as a graph showing the relationship between two or more variables. In common two-dimensional plots or graphs, data items are plotted simultaneously, for example, with respect to two variables along two perpendicular axes (e.g., X and Y axis). The graphs provide a visual representation of the relationship between variables. A value for each data item displayed can be identified with respect to each of the two featured variables by using the axes labels.

Plots or graphs are used to present data visually in mathematics, sciences, engineering, technology, finance, business and other fields. A goal of data visualization is to communicate information clearly and effectively through graphical means. Statistics and data analysis procedures generally yield their output in numeric or tabular form. Graphical techniques allow such results to be displayed in pictorial form as plots including, for example, scatter plots, histograms, probability plots, spaghetti plots, residual plots, box plots, block plots and biplots, etc. Plots or graphs can be useful for humans who can quickly comprehend and derive an understanding of data from a visual inspection of a picture that does not come as easily from perusing lists or tables of numeric values.

Computer systems and software for presenting data visually in the form of the various types of plots are widely available. Although the graphical data plots can convey information by presenting a data set visually, interpretation of the information (i.e., the plotted data) depends on the mental activities of the viewer. In general, the viewer's activities are limited to visual inspection, which cannot be tracked by observing viewer or screen behavior. Exploration of a data set displayed in a graph, beyond mere visual inspection, requires further analysis of the data set (and related data) using, for example, statistical packages or analytics software (e.g., business analytics software).

Consideration is being given to systems and methods which combine visual inspection and analytic search functions for exploration of data sets.

SUMMARY

In a general aspect, a computer device for data exploration of includes a processor and a hybrid data analysis and visualization tool ("data visualization tool" for short). The data visualization tool is configured to integrate analog representations of data query results into a graph of a data set. An analog representation may be a value or variable in analog or continuous form. The data query results may relate to implicit properties and relationships of data items in the data set. The implicit properties may in particular be properties that are not evident upon visual inspection of the graph of the data set itself. The data visualization tool may provide a user with interactive features for formulating and submitting data queries relative to a target data item in the graph, and for viewing analog representations of the data query results visually in combination with the graph of the data set on a user interface.

In another aspect, the user interface provided by the data analysis tool includes a visual data display panel and a query entry panel. The query entry panel includes one or more input elements for entering query parameters (e.g., for pre-defined query components). The pre-defined query components may, for example, include a question on a degree of similarity between the data items and the target data item with respect to an implicit property of the data items, and/or a question on an orientation of the data items toward the target data item. The pre-defined query components may also include a time criterion. The one or more input elements for entering query parameters for pre-defined query components include one or more of check boxes, menus, analog slider scales, buttons, label buttons, radio buttons, sliders, drop lists, and text boxes displayed on the query entry panel.

In another aspect, the one or more input elements for entering query parameters on the query entry panel may be displayed with pictorial or analog value representations of the query parameters. The data analysis tool may be configured use the pictorial or analog value representations of the query parameters on the query entry panel as the analog representations of data query results to enhance the graph of the data set.

In a general aspect, a computer-implemented method for exploring data that is displayed in a data plot includes providing a computer-user interface configured for a user to formulate and submit a query on the data that is displayed in the data plot, and displaying the data plot on the computer-user interface in combination with analog representations of the results of the query. The computer-user interface may present input elements for entering query parameters for one or more pre-defined query components. The input elements may, for example, include input elements for identification of a target data item relative to which the query is to be processed, selection of a question on a degree of similarity of data items relative to the target data item, selection of a question on an orientation of data items toward the target data item, and/or entering a time criterion for a query.

In another aspect, the method includes using pictorial or analog value symbols to represent one or more of the query parameters on the user interface. The method further includes visually enhancing one or more data items in the data plot with one or more of the pictorial or analog value symbols used to represent query parameters on the user interface.

In a general aspect, a non-transitory computer readable medium includes instructions capable of being executed on a processor. The instructions when executed allow a computer device to provide a computer-user interface for formulating and submitting a query relative to a data item in a data plot, and display the data plot on the computer-user interface in combination with analog representations of the results of the query. The instructions when executed may cause the computer device to use pictorial or analog value symbols to represent one or more query parameters on the computer-user interface and use one or more of the same pictorial or analog value symbols for analog representations of the results of the analytic query in the display of the data plot.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 1 also illustrates an example user interface of the hybrid data analysis and visualization tool, which includes a visual data display panel and a query entry panel, in accordance with the principles of the disclosure herein.

FIGS. 4, 6, 7, and 8 also illustrate example combined visual displays of data plots and query responses generated by the hybrid data analysis and visualization tool of FIG. 1, in accordance with the principles of the disclosure herein.

DETAILED DESCRIPTION

The term "data exploration" as used herein may refer to techniques utilized to find one's way through a data set and bring interesting or relevant aspects or properties of that data into focus. Further, the terms "plot" and "graph" of a data set may be used interchangeably herein.

An analog representation may be a value or variable in analog or continuous form. For example, the position of the hands of a clock is an analog representation of time. An analog representation may be contrasted with a digital or discrete representation which conveys information in terms of discrete, symbolic values. In keeping with the same example, a digital representation of time is a digital clock, whose representation of time is in terms of discrete variables (e.g., numbers). Analog representations of information may be more useful in human cognition than digital or discrete representations of the same information.

In accordance with the principles of the disclosure herein, a hybrid data analysis and visualization tool combines interactive query capabilities with a display of a graph or plot of a data set. The interactive query capabilities of the data hybrid data analysis and visualization tool may enable a user to combine visual inspection of the plot of the data set with analytic queries for exploring the data set. The queries may relate to information, properties or characteristics of the data that are not explicitly shown or visually discernible in the plot of the data set. In particular, the queries may relate to similarities or interrelationships between data items in the data set that are based on properties or characteristics that depend on variables other than the plot variables or co-ordinates. The query results may be displayed as a part of the plot of the data set. Analog or pictorial representations may be used to display the query results. The analog or pictorial representations may include analog or pictorial values symbols (e.g., arrows, boxes, rings, or other visual indicia). The pictorial or analog value symbols may include an icon or symbol whose size or shape may be an analog representation of a query parameter value. Data items in the plot may be visually highlighted, annotated, marked or enhanced according to the query results to visually convey additional information about the data items that is not explicitly shown by the plot itself. The hybrid data analysis tool may allow a user to visually inspect not only the data items in the plotted data set directly, but to also visually inspect the similarities and interrelationships between data items in the plotted data set that are uncovered by the queries.

Figure 1:
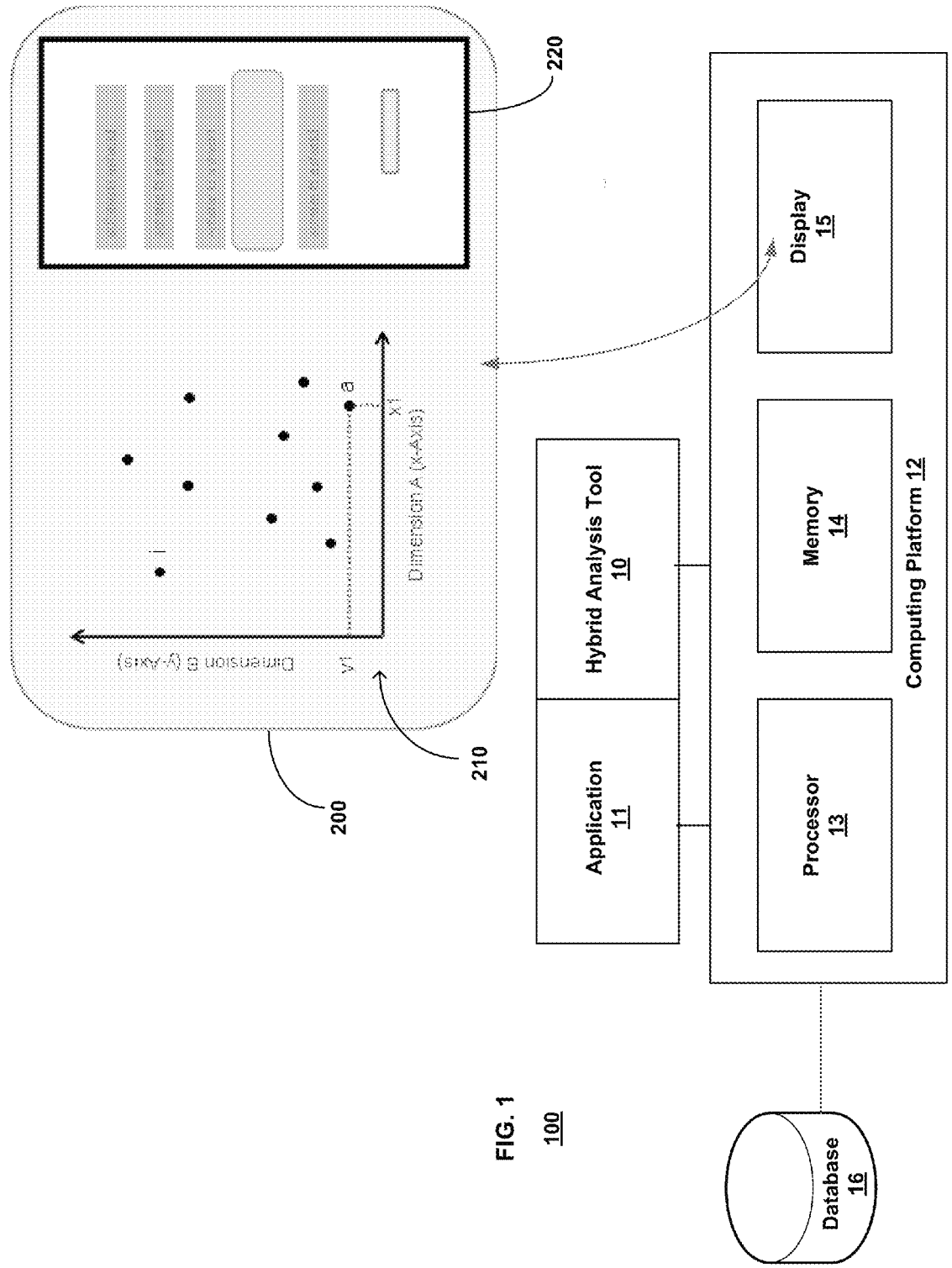
FIG. 1 is a schematic block diagram illustrating a hybrid data analysis and visualization tool installed or hosted on a computer system, in accordance with the principles of the disclosure herein.

FIG. 1 is a schematic block diagram illustrating a data visualization tool 10 installed or hosted on a host computer system 100, in accordance with the principles of the disclosure herein. For economy in words, hybrid data analysis and visualization tool 10 may be referred to hereinafter simply as "data visualization tool 10."

Data visualization tool 10 may be configured to provide a user with capabilities to formulate or state queries to visually explore implicit properties or characteristics of data items in a plot and to visualize hidden relationships between the data items. Data visualization tool 10 may provide a user interface (e.g., UI 200) through which a user can formulate and submit queries to visually explore the hidden relationships between data items in a plot. A query, in data visualization tool 10, may be formulated by combining various query parts or components on the user interface. Each query part or component may include graphic visual elements. These graphic visual elements may be used to highlight data items, which are retrieved or identified on the basis of user-submitted query, in the plot.

Data visualization tool 10 may be hosted on any suitable computing platform 12 in computing system 100. Computing system 100 infrastructure may consist of one or more physical machines, virtual machines, central processing units, disk drives and other resources that may be distributed over diverse locations or nodes connected by a network. FIG. 1 shows, for example, data visualization tool 10 hosted on a computing platform 12 that is supported, for example, by a processor 13, a memory 14 and a display screen 15, and linked to a data source (e.g., database 16). Data visualization tool 10 may be hosted on computer system 100/computing platform 12 by itself or in conjunction with other applications (e.g., business analytics or other data analysis or data processing applications). FIG. 1 shows, for example, data visualization tool 10 hosted on computing platform 12 in conjunction with a computer application 11, which may, for example, be a business analytics application.

FIG. 1 further shows an example user interface (UI) 200 of data visualization tool 10, in accordance with the principles of the disclosure herein. In operation, data visualization tool 10 may present UI 200 to a user, for example, on display screen 15 of computing platform 12. UI 200 may include a visual data display panel 210 and a query entry panel 220. Data visualization tool 10 may generate or retrieve data items from a data source (e.g., memory 13, database 16, or other application) to be displayed in a plot in visual data display panel 210. The data items generated or retrieved by the computer application may be shown in visual data display panel 210 in a pictorial format (e.g., as a scatterplot, histogram, probability plot, spaghetti plot, residual plot, box plots, block plot or a biplot, etc.) that is suitable for visual inspection by the user.

Figure 2:
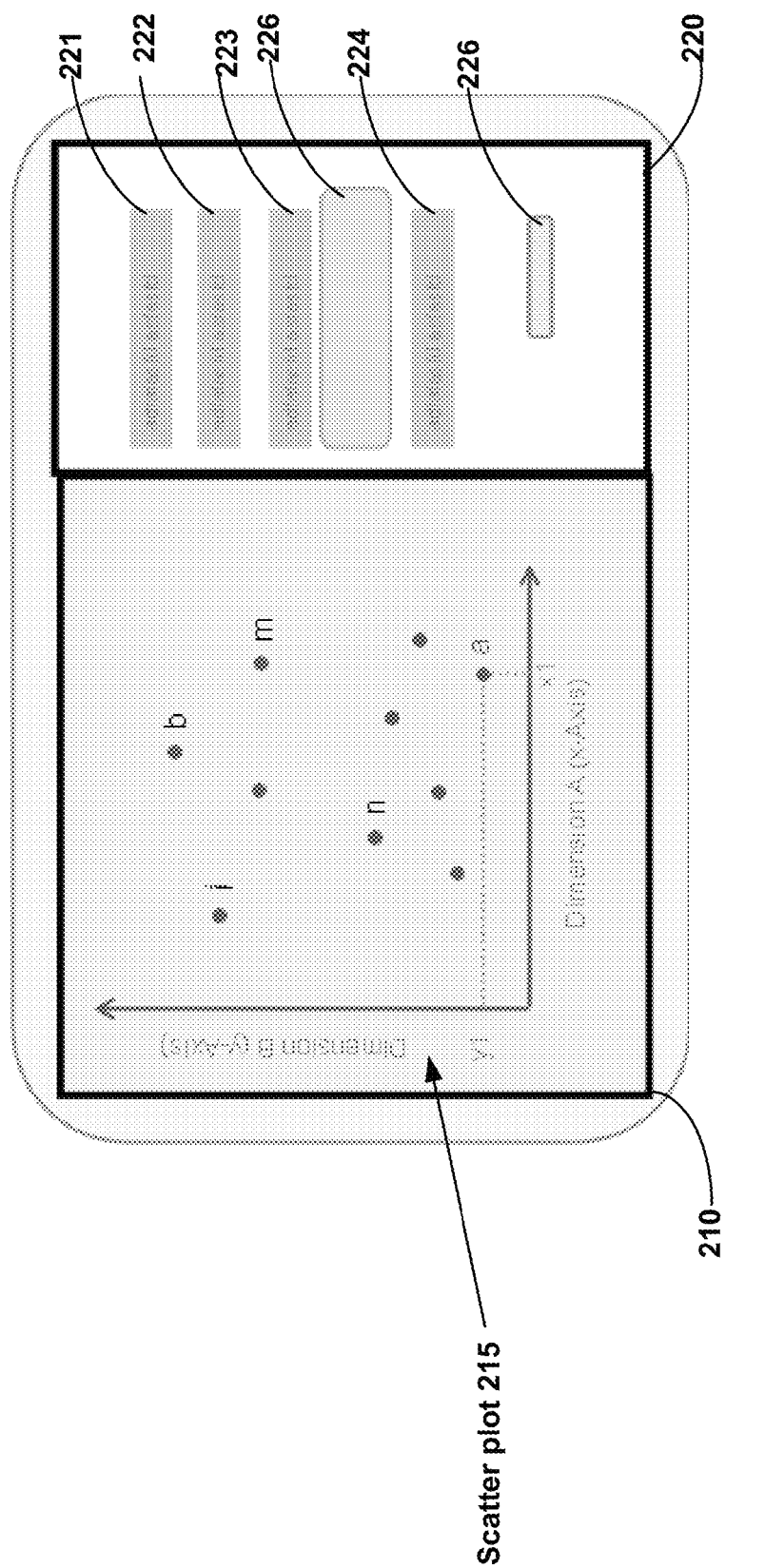
FIG. 2 is an illustration of an example display of a data set in a pictorial format and an example schematic representation of query input elements on the user interface of the hybrid data analysis tool of FIG. 1, in accordance with the principles of the disclosure herein.

FIG. 2 shows, for example, a data set D with data items {a, b, c,}, which may have been generated or retrieved for display by the hybrid data analysis tool. The data set D may be displayed in visual data display panel 210 of UI 200 in a pictorial format as a scatterplot 215. Scatter plot 215 may use Cartesian coordinates to display data item values in two dimensions (A and B). The data items {a, b, c, . . . } may be displayed as a collection of points with the position of each point along a horizontal co-ordinate axis (e.g., x-Axis) determined by the value of one variable in one dimension (A), and its position along a vertical co-ordinate axis (e.g., y-Axis) determined by the value of the other variable in the second dimension (B). For example, the position of data item a may have a numeric position value a (x1, y1) in scatter plot 215, where x1 and y1 are the values of the corresponding variables of data item a on the x and y axes, respectively.

In accordance with the principles of the disclosure herein, data visualization tool 10 may be configured to allow the user to query (e.g., via query entry panel 220) the displayed data set D and/or related data sources (e.g., memory 13, database 15, network or other application) for additional information on the displayed data items in visual data display panel 220 of UI 200. Further, data visualization tool 10 may display the query results in a graphic or pictorial format on the same plot as the displayed data set D. The graphic or pictorial format of the displayed query results may include pictorial or analog value symbol representations of the query results. Graphical elements, icons, marks or indicia (e.g., highlighting, bold or italicized fonts, boxes, arrows, circles, labels or other symbols or indicia) may be used to pictorially depict the query results. The graphical or pictorial format of the displayed query results may visually enhance the displayed data items of the data set D. The graphical or pictorial format may, for example, highlight or endow particular data items of the data set D with additional visual characteristics or features that may make the query results amenable to visual inspection by the user and to facilitate explicit visual exploration of the displayed data set.

A user query on data visualization tool 10 may, for example, relate to implicit relationships between particular data items in the displayed data set D. Query entry panel 220 may include one or more input elements (e.g., GUI elements 221-224) that are configured to receive or accept parameters for defining or stating the user query. GUI elements 221-225 may, for example, include one or more of check boxes, menus, analog slider scales, buttons, label buttons, radio buttons, sliders, drop lists, text boxes, etc. A user may be able to formulate a query by entering or inputting query parameters in the input elements of query entry panel 220. The user may use appropriate computer input devices and techniques (e.g., alpha-numeric character or text entry using a keyboard, point-and-click techniques using a pointer device, hold-and-slide techniques for slider bars, etc.) for entering or inputting the query parameters. Query entry panel 220 may further include, include an action mechanism (e.g., a "GO" button 226) which the user can activate to submit a user-formulated query for processing (e.g., by processor 13).

In example implementations of data visualization tool 10, query entry panel 220 may be configured to accept general or free form queries (i.e. queries of any type) related to the displayed data set. In other implementations of data visualization tool 10, query entry panel 220 may be configured to accept or allow queries with pre-defined components or parts. The one or more input elements (e.g., GUI elements 221-224) may be accordingly configured to accept input parameters for formulating a query having the pre-defined components or parts.

A "similarity" type query with respect to a particular data item displayed in visual data display panel 210 may, for example, seek to identify other data items by the degree of similarity with the particular data item with regard to an implicit characteristic or property of the data items.

EXAMPLE SCENARIO ONE

In an example scenario ("Scenario One") the data items {a, b, c . . . } displayed in scatter plot 215 may be values of total product sales by different sales entities a, b, c . . . etc. for a given month. For this scenario, the different sales entities may be represented along the x-axis and their total monthly product sales may be represented along the y-axis to define the positions of displayed data items {a, b, c . . . } in scatter plot 215. The displayed total monthly product sales {a, b, c . . . } may have implicit characteristics or properties (e.g., a mix of different types of products sold, a rate of change in monthly sales amounts, profitability, etc.) that are not explicitly shown in, or evident upon visual inspection of scatter plot 215. An example similarity query with reference to a data item m may, for example, seek to identify other data items that have a similar characteristic or property (e.g., a similar product mix, a similar rate of change in the amount of monthly product sales, etc.) as sales entity m.

Figure 3:
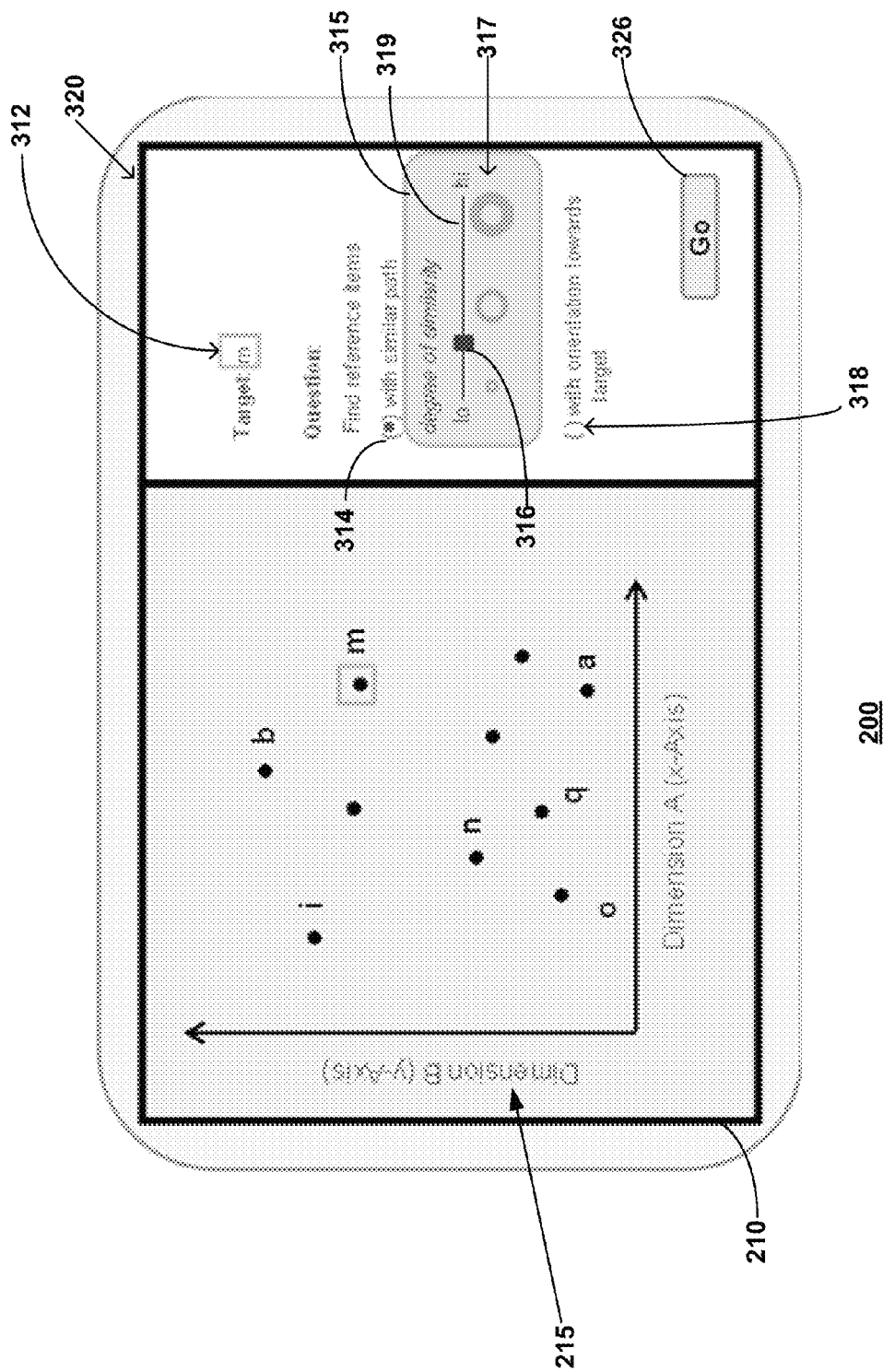
FIGS. 3-8 are illustrations of example query entry panels of the hybrid data analysis and visualization tool of FIG. 1 that are configured to accept parameters for pre-defined components of analytic data exploration queries, in accordance with the principles of the disclosure herein.

FIG. 3 shows an example query entry panel 320 of data visualization tool 10/UI 200 that is configured to accept parameters for pre-defined components of queries in scenarios such as Scenario One. A first pre-defined query component in query entry panel 320 may, for example, pose a query question on which other data items have a similar path as a target data item. A second pre-defined query component in query entry panel 320 may pose a query question on which data items have an orientation toward the target data item.

Query entry panel 320 may have a customized arrangement of input areas or GUI elements that are configured to receive or accept parameters for the pre-defined query component questions. The customized input elements of query entry panel 320 may, for example, include a text box 312, which is labeled as "Target", for identifying a target data item relative to which the pre-defined query questions may be processed. The target data item may be but need not be a data item that is already displayed in scatter plot 215. Data visualization tool 100 may allow a user to select a target data element (e.g., data item m) for the queries, for example, by entering text (e.g., "m") in text box 312 and/or by marking or selecting the target data element (e.g., by pointing and clicking on the target data element m) if it is already displayed in scatter plot 215.

Further, the input elements in query entry panel 320 may include radio buttons or check boxes (e.g., check boxes 314 and 318), which allow a user to select one or more of the two pre-defined query questions to include in a query. For the first pre-defined query question on which other displayed data items have a similar path as the target data item, query entry panel 320 may include an input box 315 which allows a user to select a degree of similarity threshold or metric (e.g., low to high similarity) for the query. Input box 315 may include, for example, a slider 316 that allows the user to select the value of the similarity metric (e.g., between a low and a high value) on an analog sliding scale 319. Suitable graphical icons (e.g., rings 317 of different thicknesses), which pictorially represent varying values of similarity from low to high along the analog sliding scale, may be used as visual aids to guide the user's selection of the value of the degree of similarity metric for the query question. Input box 315 may be displayed continuously in query entry panel 320 or only as a pop-up window that appears only when the user selects a check box (e.g., check box 314).

After a user has formulated the query question (e.g., by identifying a target data item in text box 312, marking check box 314 for the similarity question, and positioning slider 316 to select a value for the degree of similarity metric), the user may submit the query question for processing by activating an action button (e.g., GO button 326) on query entry panel 320.

Query processing by data visualization tool 10 may result in identification of qualified data items which fulfill at least the degree of similarity to the target data item that was indicated by the position of slider 316 in the user-submitted query. The qualified data items may include data items that were already present in scatter plot 215 (e.g., data items o, q, b, etc.) and/or may include data items that were not already present in scatter plot 215 but are available in the queried data source (e.g., memory 13, or database 16).

Figure 4:
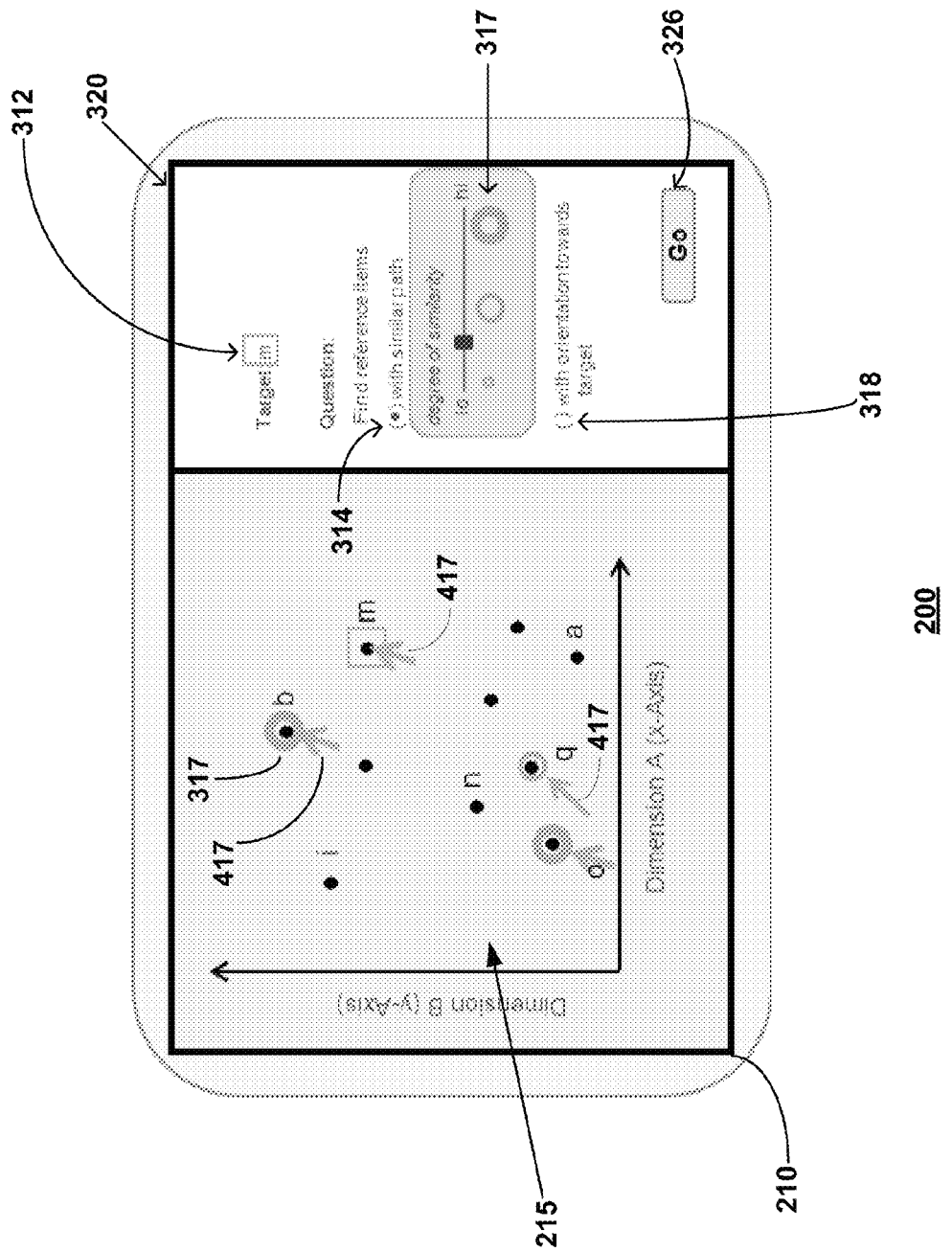

The query response or results may be displayed by data visualization tool 10 in visual data display panel 210 for visual inspection by the user. FIG. 4 shows example query results displayed on visual data display panel 210 in response to the user-submitted similarity query in Scenario One. In the example query results shown, the target data item (e.g., data item m) and qualified data items (e.g., data items o, q and b), which fulfill at least the degree of similarity metric that was indicated by the position of slider 316 in the user-submitted query, may be highlighted to facilitate visual identification or inspection by the user. The target data item m may be highlighted using the same icon (e.g., text box icon 312) used to identify it in query entry panel 320. Further, the qualified data items (e.g., data items o, q and b) may be highlighted using the same graphical icons (e.g., rings of different thicknesses 317) that pictorially represent varying degrees of similarity in the legend for the analog sliding scale 319 in query entry panel 320. These highlighting graphical icons may visually inform the user of the degree of similarity of each of the qualified data items to the target data item. Further, the query response displayed on visual data display panel 210 may additionally include visual indicators or markers (e.g., arrows 417) that show relative paths or trends of the qualified data items and the target data item.

It will be noted that the query response displayed in FIG. 4 includes highlighting of the similarity characteristics of the query-retrieved qualified data items and the target data item. However, some versions of data visualization tool 10 may further include a switch control or UI feature that enables a user to view the similarity or other characteristic of any particular data item displayed in visual data display panel 210 even if that particular data item is not a query-retrieved qualified data item.

In a version of data visualization tool 10, the query processing may retrieve qualified data items from a source database (e.g., memory 13, database 16, etc.) that were previously not displayed in scatter plot 215 if they fulfill the query criteria for similarity to the target data item (e.g., data item m). Similarly, the same or other version of data visualization tool 10 may allow a user to run queries relative to a target data item that was not previously displayed in scatter plot 215 (e.g., by explicitly entering target data item identifying-text in input box 315). These previously un-displayed data items and their similarity characteristics may be displayed and highlighted in the query response presented by data visualization tool 10 on visual data display panel 210 in the same manner as the previously-displayed qualified data items (e.g., data items o, q and b) are displayed and highlighted as described above with reference to FIG. 4.

EXAMPLE SCENARIO TWO

In another example scenario ("Scenario Two") the data items {a, b, c . . . } shown in scatter plot 215 may, for example, represent a current measure of business competitiveness of entities a, b, c, etc. The data plotted in scatterplot 215 may explicitly convey visual information on the current competitiveness values of the entities a, b, c, etc. to a user. However, the displayed data items {a, b, c . . . } may have implicit characteristics or properties (e.g., short term and long term trends, or rate of change in competitiveness), which are not explicitly shown in or evident upon visual inspection of scatter plot 215 of the data items {a, b, c . . . }. For data exploration in such a scenario, another example query entry panel of data visualization tool 10/UI 200 may include pre-defined queries that focus on the degree of correspondence between paths of a target data item and other data items.

Figure 5:
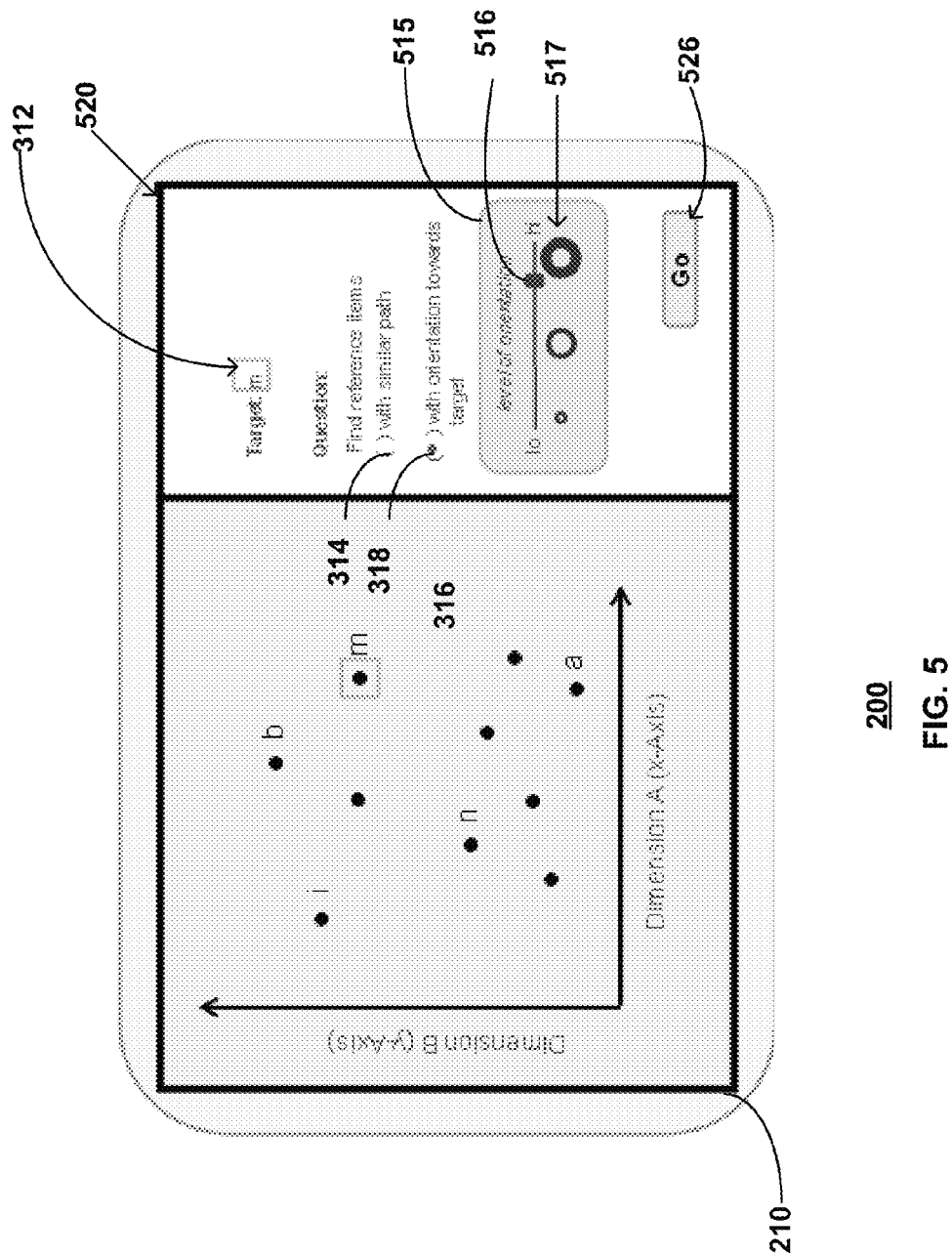

FIG. 5 shows an example query entry panel 520 with pre-defined queries that that focus on the degree of correspondence between a path of a target data item and other data items in scenarios such as Scenario Two. Like the input elements of query entry panel 320 shown in FIG. 3, the input elements of query entry panel 520 may include radio buttons or check boxes (e.g. check boxes 314 and 318), which allow a user to select either of the pre-defined similarity or orientation query questions to submit for processing. For the query question on which of the other displayed data items have an orientation toward the target data item, query entry panel 520 may include an input box 515 which allows a user to select a level of orientation metric (e.g., a low to a high level of orientation) for the query. Input box 515 may include a slider 516, which allows the user to select the level of orientation metric on an analog sliding scale. Suitable graphical icons (e.g., rings of different thicknesses 517), which pictorially represent varying levels of orientation from low to high along the analog sliding scale, may be used as a visual aid to guide user selection of the level of orientation metric for formulating the query question. Like input box 315 on query entry panel 320, input box 515 may be displayed on query entry panel 520 continuously or as a pop-up window that appears only when the user selects a query check box (e.g., check box 318).

After a user has formulated the query question (e.g., by entering target data item identifying-text m in text box 312, marking check box 318 for the orientation question, and positioning slider 516 to select a level of orientation metric), the user may submit the query question for processing by activating an action button (e.g., GO button 526) on query entry panel 520.

Processing by data visualization tool 10 of the user-submitted query may result in identification of qualified data items which fulfill at least the level of orientation toward the target data item that was indicated by the position of slider 516 in the user query. The qualified data items may include data items that were already present in scatter plot 215 (e.g., data items i, n, o, q and b). The query results may be displayed pictorially by data visualization tool 10 in visual data display panel 210 for visual inspection by the user.

Figure 6:
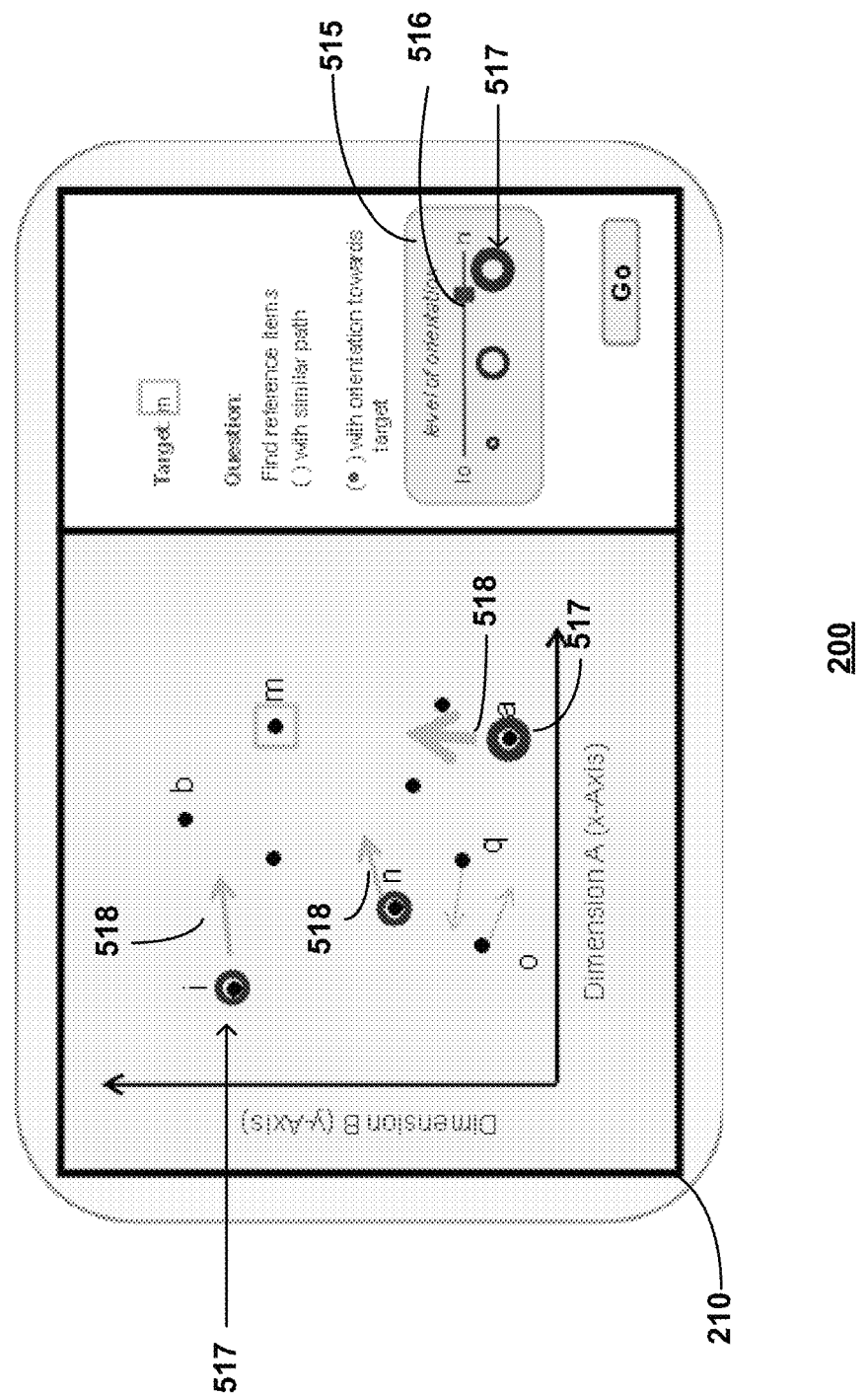

FIG. 6 shows example query results displayed on visual data display panel 210 in response to the user-submitted similarity query in Scenario Two. In the display, the qualified data items (e.g., data items i, n, o, q and b) may be highlighted to facilitate visual identification or inspection, using, for example, the same graphical icons (e.g., rings of different thicknesses 517) that pictorially represent varying levels of orientation in the legend for the analog sliding scale in input box 515.

The query response displayed on visual data display panel 210 may include additionally visual indicators or markers (e.g., arrows 518) that pictorially illustrate the relative orientation and strength with which the qualified data items are moving toward the target data item m. For example, as shown in FIG. 6, the direction and the thickness of arrow 518 associated with qualified data item a may visually suggest to the user that entity a has business competitiveness measure that is strongly increasing up ward to that of the target data item m. The direction and the thickness of arrow 518 associated with qualified data item n may, for example, visually suggest to the user that entity n has business competitiveness measure that is increasing less strongly than qualified data item a toward a value below that of the target data item m. Similarly, the direction and the thickness of arrows 518 associated with data items o and q may visually suggest to the user that entities o and q have business competitiveness measures that are either decreasing or are directed away from that of the target data item m.

It will be noted that the query response displayed in FIG. 6 includes highlighting of the orientation characteristics of the query-retrieved qualified data items and the target data item, However, some versions of data visualization tool 10 may further include a switch control or UI feature that enables a user to view the orientation characteristics or other characteristic of any particular data item displayed in visual data display panel 210 even if that particular data item is not a query-retrieved qualified data item.

Figure 7:
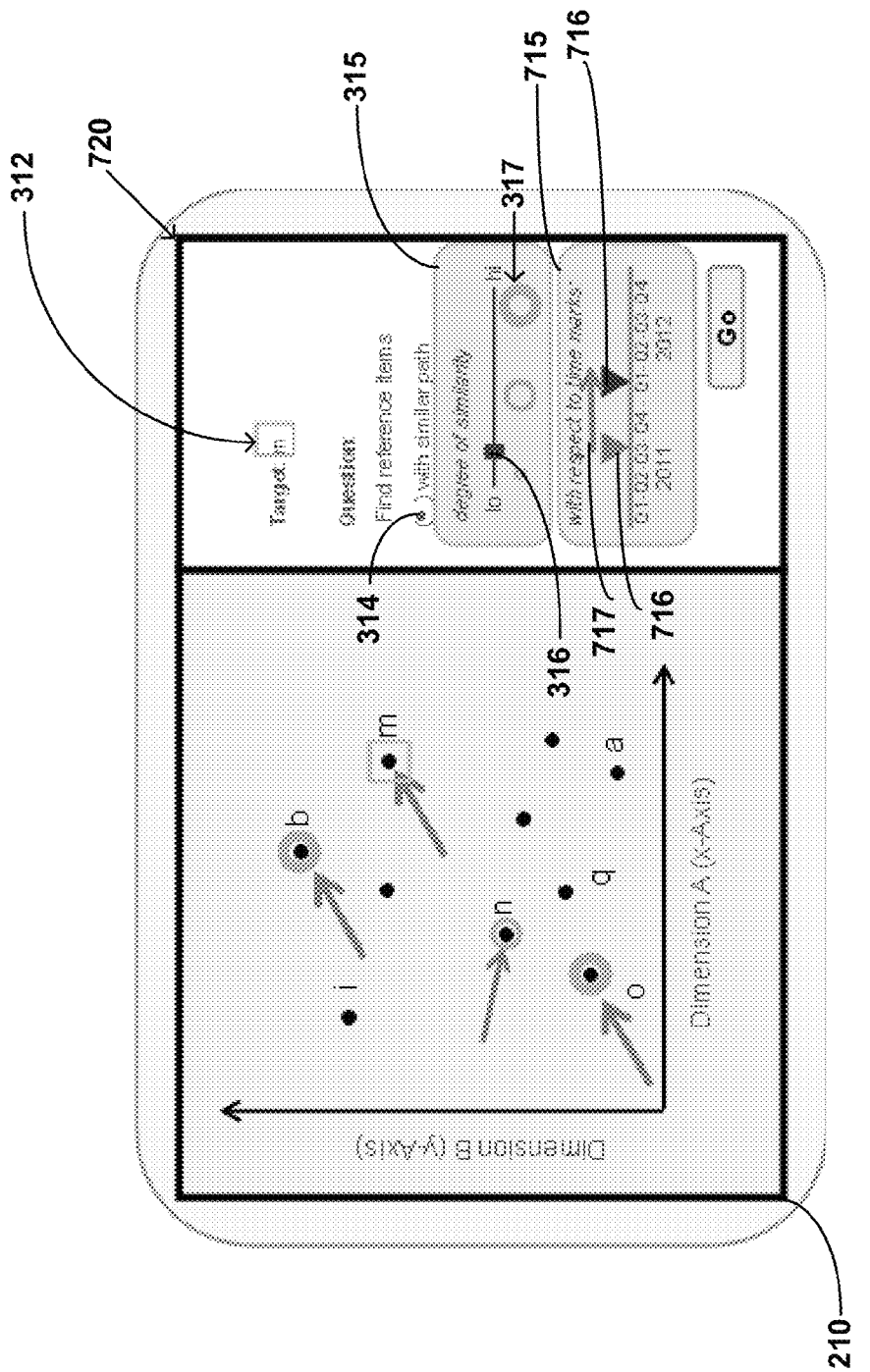
Figure 8:
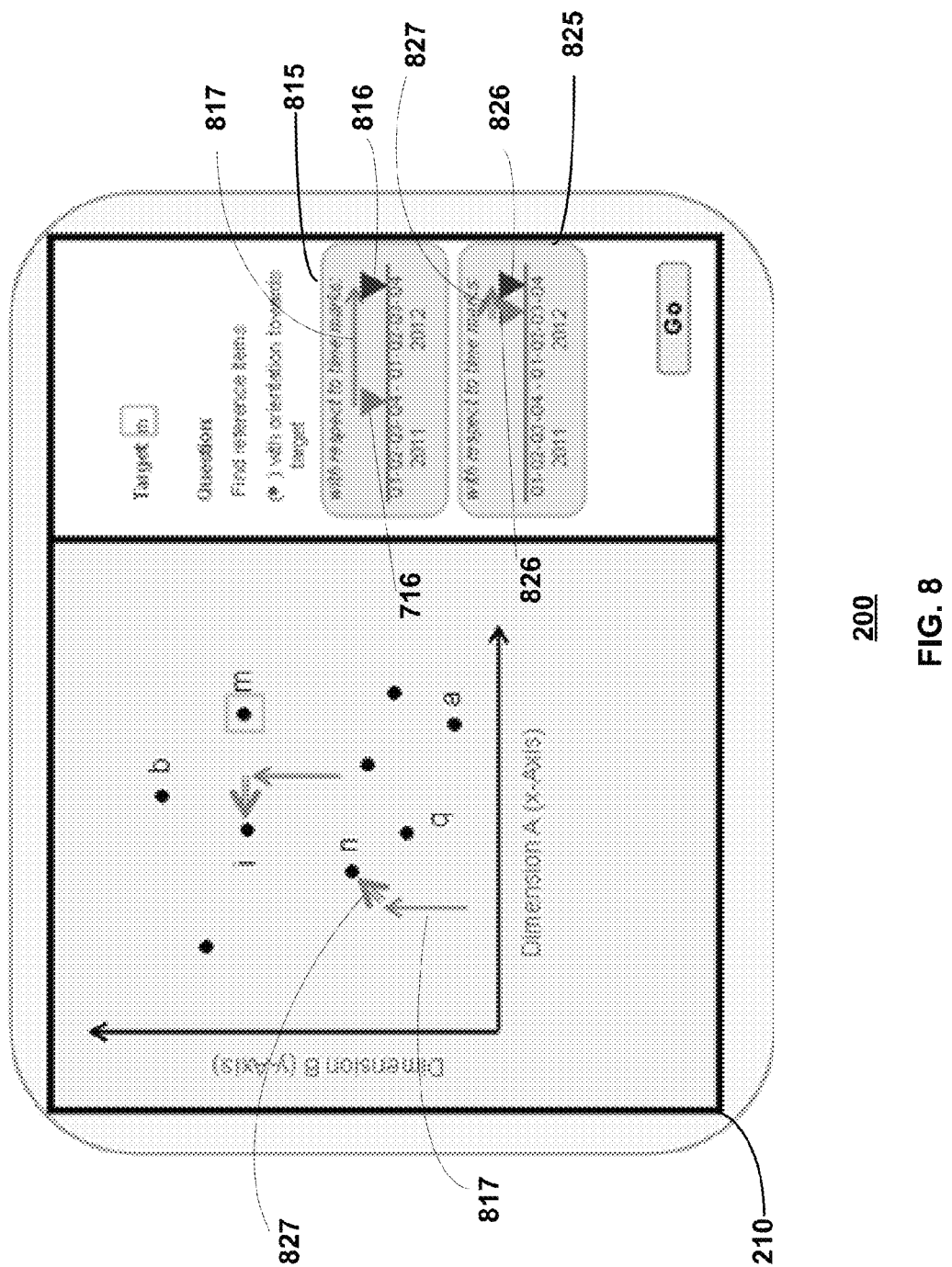

It will be understood that the types of queries or the query parameters that may be used with data visualization tool 10/UI 200 are not limited to the examples described above with reference to FIGS. 3-6. FIGS. 7 and 8 show example versions of data visualization tool 10/UI 200 in which the composition of the pre-defined queries described above with reference to FIGS. 3-6 are modified or extended to include display of temporal criteria.

FIG. 7 shows an example query entry panel 720 in which the query question on which of other data items have a similar path as a target data item (shown on query entry panel 320) is extended with query components that are based on time criteria. In particular, query entry panel 720 may include an input box 715 with sliding time markers 716 on a sliding scale that allow the user to enter time criteria in addition to a degree of similarity criteria (input box 315) for formulating the query question on which of other data items have a similar path as a target data item. Like input box 315, input box 715 may be displayed on query entry panel 720 continuously or as a pop-up window that appears only when the user selects a query check box (e.g., check box 314).

A user may select a time interval criterion for the query, for example, by suitably positioning or setting sliding time markers 716 at different beginning and ending times (e.g., Q3 2011 and Q1 2012) on the sliding scale in input box 715. The selected time interval may be represented pictorially in query entry panel 720 by a graphical icon (e.g., arrow 717) extending between the positions of sliding time markers 716 set by the user. In this example, query processing by data visualization tool 10 may result in identification of qualified data items which meet the degree of similarity criteria (indicated by the position of slider 316) over time interval 717 that was indicated by the positions of sliding time markers 716. In the same manner that the similarity characteristics of the qualified data items returned by the query are highlighted using the graphical icons (e.g., rings of different thicknesses 317) used in query entry panel 320 in FIG. 4, the similarity and time characteristics of the displayed query results here may be highlighted using the same graphical icons that are used to represent the similarity and time characteristics in the query entry panel 720. FIG. 6 shows, for example, qualified data items o, n and b that are visually highlighted using the same rings of varying thickness 317 and arrows 717 that are used as graphical icons for the respective query characteristics in query entry panel 720.

FIG. 8 shows an example query entry panel 820 in which the query question on which other displayed data items have an orientation toward the target data item (query entry panel 520) is extended with further query components based on time parameters. In particular, query entry panel 820 may include a first input box 815 and a second input box 825 for adding time criteria to the orientation query that may be set in query entry panel 520. For visual clarity, only first input box 815 and second input box 825 are shown and other query components (e.g., input box 515) are omitted from FIG. 8.

Like input box 715 of query entry panel 720, first input box 815 and second input box 825 may include pairs of sliding time markers (e.g., time markers 816 and 826) on sliding scales that allow the user to enter time criteria for formulating the query question on which of other data items have orientations toward the target data item. Further like input box 715, first input box 815 and second input box 825 may be displayed on query entry panel 820 continuously or as pop-up windows that appear only after the user selects a query check box (e.g., check box 318).

In the same manner as described above for selecting a time interval criterion using input box 715 in query entry panel 720, a user may select time interval criteria (e.g., a short time interval and a long time interval) for the query, for example, by suitably positioning or setting sliding time markers 816 and 826 on the sliding scales in first input box 815 and second input box 825, respectively. The user-selected short and long time intervals may, for example, be about one about one year long (e.g., extending from 4Q 2011 to 4Q 2012) and one quarter year long (e.g., extending from 3Q 2012 to 4Q 2012), respectively, as shown in FIG. 8. The selected long time and short time intervals may be represented pictorially in query entry panel 820 by graphical icons (e.g., arrows 817 and 827, respectively).

In this example, query processing by data visualization tool 10 may result in identification of qualified data items which meet at least the level of orientation toward the target data item that was indicated by the position of slider 516 (shown in query entry panel 520) in the user submitted-query over both the long time interval 817 and the short time interval 827. As in the previous examples described herein, data visualization tool 10 may highlight query results presented in the visual data display panel 210 using the same graphical icons used that are used to visually illustrate query components in the query entry panel 820. FIG. 8 shows, for example, qualified data items i and n displayed in scatter plot 215 that are highlighted or enhanced by both long time interval arrows 817 and short interval arrows 827 that are used to visually illustrate query time interval components in query entry panel 820. For visual clarity, highlighting of other query criteria (e.g., level of orientation criteria) other than the temporal criteria is omitted in FIG. 8.

Adding query components and highlighting them in the display of query results as in the forgoing examples may enable a user to visually explore data in detail. For example, the display of query results in FIG. 8 may allow a user to discern that the orientations of both data items i and n were moving vertically upward over the one year time interval as visually highlighted by the long time interval arrows 817. However, as visually highlighted by short interval arrows 818, the displayed data shows both data items i and n changed course over the last one quarter year time interval. A user can visually discern from the query result display in FIG. 8 in detail that data item i is now moving away from target data item m and data item n is moving toward target data item m as indicated by the directions of the data-highlighting short interval arrows 818.

Figure 9:
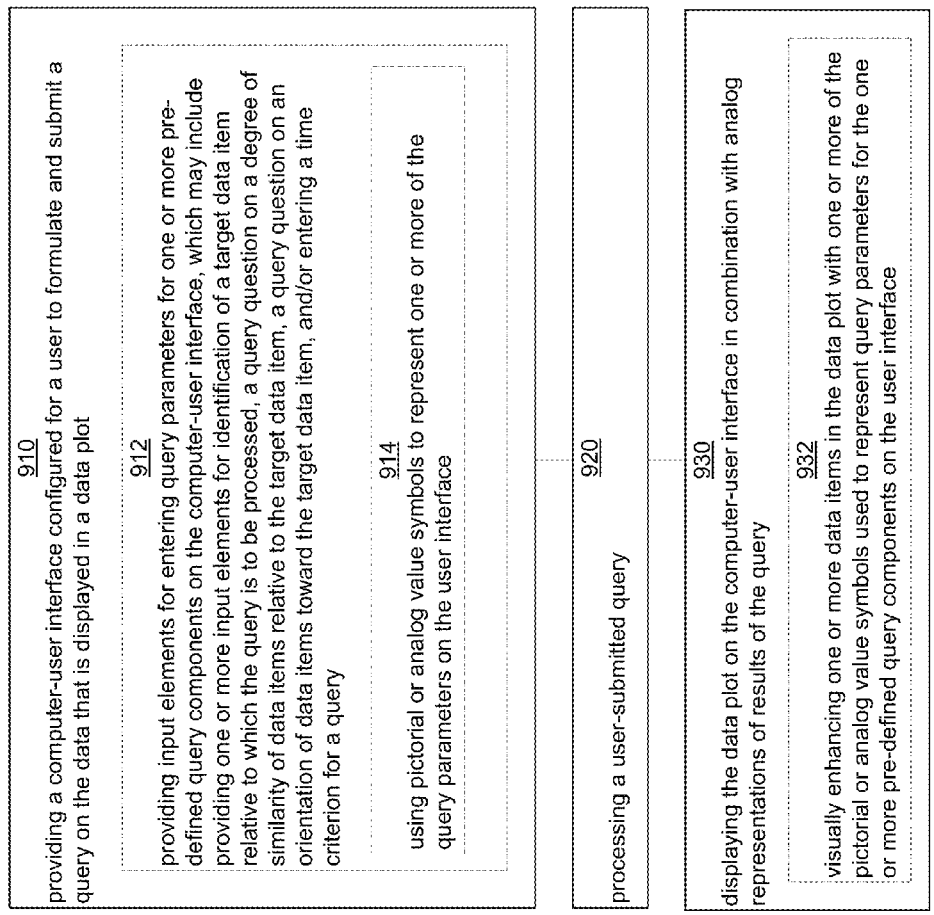
FIG. 9 is a flow chart illustration of an example visual data exploration method combining visual inspection and analytic search functionality, in accordance with principles of the disclosure herein.

FIG. 9 shows an example computer-implemented method 900 for exploring data that is displayed in a data plot on a user interface, in accordance with the principles of the disclosure herein. Method 900 includes providing a computer-user interface that is configured to allow a user to formulate and submit a query on the data that is displayed in the data plot (910), processing the user-submitted query (920), and displaying the data plot on the computer-user interface in combination with analog representations of results of the query (930). The user-submitted query may relate to implicit properties of data items in the data plot that may not be evident up on visual inspection of the data plot itself.

Providing a computer-user interface configured for a user to formulate and submit a query on the data that is displayed in the data plot 910 may include providing input elements for entering query parameters for one or more pre-defined query components on the computer-user interface (912). The pre-defined query components of the query on the user interface may, for example, include identification of a target data item relative to which the query is to be processed, a question on a degree of similarity of data items relative to the target data item, a query question on which data items have an orientation toward the target data item, and/or components defining bounds (e.g., upper limits, lower limits or ranges) for query parameters (e.g., time), etc. The input elements may include one or more of check boxes, menus, analog slider scales, buttons, label buttons, radio buttons, sliders, drop lists, text boxes, etc.

Providing input elements for entering query parameters for one or more pre-defined query components on the computer-user interface 912 may include providing one or more input elements for identification of a target data item relative to which the query is to be processed, a query question on a degree of similarity of data items relative to the target data item, a query question on an orientation of data items toward the target data item, and/or entering a time criterion for a query. Providing input elements for entering query parameters for one or more pre-defined query components on the computer-user interface 912 may also include using pictorial or analog value symbols to represent one or more of the query parameters for the one or more pre-defined query components on the user interface (914). The pictorial or analog value symbols may include, for example, arrows, boxes, rings, or other visual indicia. The pictorial or analog value symbols may include an icon or symbol whose size or shape may be an analog representation of a query parameter value. Further, displaying the data plot on the computer-user interface in combination with analog representations of results of the query 930 may include visually enhancing one or more data items in the data plot with one or more of the pictorial or analog value symbols that are used to represent query parameters the one or more pre-defined query components on the user interface (932).

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer device, comprising:
 a processor; and
 a data visualization tool configured to display data items of a data set in a graph and display a query panel associated with the graph, the query panel including one or more data entry fields to receive queries regarding properties of one or more specific data items in the graph relative to a target data item,
 the data visualization tool further configured to, in response to a user-entered query on the query panel regarding a visually unrepresented property of the specific data items displayed in the graph relative to the target data item, assign a discrete value selected from a continuous range of analog values to represent the visually unrepresented property returned by the query, and add an analog representation of the discrete value selected from the continuous range of analog values to represent the visually unrepresented property returned by the data query into the displayed graph of the data items,
 wherein the query panel includes at least one input element for selecting one or more pre-defined queries, the one or more pre-defined queries including a pre-defined query having a degree of similarity between the data items relative to the target data item as a query parameter, and wherein data items which have a queried degree of similarity to the target item with respect to an implicit property of the data items are identified on the displayed graph upon submission of the pre-defined query for processing.

2. The computer device of claim 1, wherein the data visualization tool includes interactive features for submitting data queries and for viewing analog representations of the data query results visually in combination with the graph of the data items on a user interface.

3. The computer device of claim 2, wherein the data visualization tool includes interactive features for submitting a data query relative to a target data item displayed in the graph of the data items on the user interface.

4. The computer device of claim 2, wherein the user interface includes a visual data display panel and a query entry panel.

5. The computer device of claim 4, wherein the query entry panel includes one or more input elements for entering query parameters.

6. The computer device of claim 1, wherein the pre-defined query components include a question on an orientation of data items toward the target data item.

7. The computer device of claim 1, wherein the pre-defined query components include a time criterion.

8. The computer device of claim 1, wherein the one or more input elements for entering query parameters for pre-defined query components include one or more of check boxes, menus, analog slider scales, buttons, label buttons, radio buttons, sliders, drop lists, and text boxes displayed on the query entry panel.

9. The computer device of claim 1, wherein the one or more input elements for entering query parameters on the query entry panel are displayed with pictorial representations of the query parameters.

10. The computer device of claim 9, wherein the data visualization tool is configured use the pictorial representations of the query parameters on the query entry panel in conjunction with the analog representations of data query results to enhance the graph of the data set.

11. A computer-implemented method for exploring data that is displayed in a data plot, the method comprising:
 providing a computer-user interface configured to allow a user to formulate and submit a query regarding on a visually unrepresented property of a specific item of the data that is displayed in the data plot relative to a target data item:
 assigning a discrete value selected from a continuous range of analog values to represent the visually unrepresented property returned by the query; and displaying an analog representation of the discrete value selected from the continuous range of analog values to the visually unrepresented property of the specific item of the data relative to the target data item returned by the query in the data plot in addition to the data that is displayed in the data plot,
 wherein providing a computer-user interface configured for a user to formulate and submit a query on the data that is displayed in the data plot includes providing an input element for entering a query parameter of a pre-defined query on the user interface,
 wherein providing an input element for entering a query parameter includes providing an input element for a selecting a degree of similarity of data items relative to the target data item with respect to an implicit property of the data items as the query parameter of the pre-defined query, and wherein data items which have a selected degree of similarity relative to the target item with respect to the implicit property of the data items are identified on the data plot upon submission of the pre-defined query for processing.

12. The method of claim 11, wherein providing input elements for entering query parameters further include providing an input element for at least one of:
 identification of a the target data item relative to which the query is to be processed; and
 selection of a question on an orientation of data items toward the target data item.

13. The method of claim 11, wherein providing input elements for entering query parameters include providing an input element for entering a time criterion for a query.

14. The method of claim 11, wherein providing input elements for entering query parameters includes using one or more of pictorial and analog value symbols to represent one or more of the query parameters on the user interface.

15. The method of claim 14, wherein displaying analog representations of the implicit properties of the data revealed by the query in the data plot in addition to the data that is displayed in the data plot includes visually enhancing one or more data items in the data plot with one or more of the pictorial symbols used to represent query parameters on the user interface.

16. A non-transitory computer readable medium, comprising:
 instructions capable of being executed on a processor, which instructions when executed allow a computer device to:
 display data items of a data set in a data plot;
 provide a computer-user interface for formulating and submitting a query regarding a visually unrepresented property of a specific data item in the data plot relative to a target data item:
 assign a discrete value selected from a continuous range of analog values to represent the visually unrepresented property returned by the query; and
 display an analog representation of the discrete value selected from the continuous range of analog values to represent the visually unrepresented property returned by the query in the data plot in addition to the displayed data items in the data plot;

wherein providing a computer-user interface configured for a user to formulate and submit a query includes providing an input element for entering a query parameter of a pre-defined query on the user interface, wherein providing an input element for entering a query parameter includes providing an input element for a selecting a degree of similarity of data items relative to the target data item with respect to an implicit property of the data items as the query parameter of the pre-defined query, and wherein data items which have a selected degree of similarity relative to the target item with respect to the implicit property of the data items are identified on the data plot upon submission of the pre-defined query for processing.

17. The non-transitory computer readable medium of claim 16, wherein the instructions when executed on the processor cause the computer device to use one or more of pictorial and analog value symbols to represent one or more query parameters on the computer-user interface.

18. The non-transitory computer readable medium of claim 17, wherein the instructions when executed on the processor cause the computer device to use one or more of the one or more of pictorial and analog value symbols that represent one or more query parameters on the computer-user interface for analog representations of the results of the query in the display of the data plot.

\* \* \* \* \*